K. F. HARLOW & C. E. MATHEWS.
POWER TRANSMISSION MECHANISM.
APPLICATION FILED JULY 23, 1917.

1,268,838.

Patented June 11, 1918.

WITNESSES:
A. L. Newsham
Paul A. Nielsen

INVENTORS.
K. F. Harlow and
C. E. Mathews
BY
H. J. Sanders
ATTORNEY

UNITED STATES PATENT OFFICE.

KENNETH F. HARLOW AND CHARLES E. MATHEWS, OF BELOIT, WISCONSIN.

POWER-TRANSMISSION MECHANISM.

1,268,838.　　　　　　Specification of Letters Patent.　　Patented June 11, 1918.

Application filed July 23, 1917. Serial No. 182,222.

*To all whom it may concern:*

Be it known that we, KENNETH F. HARLOW and CHARLES E. MATHEWS, citizens of the United States, residing at Beloit, in the county of Rock and State of Wisconsin, have invented certain new and useful Improvements in Power-Transmission Mechanism, of which the following is a specification.

This invention relates to improvements in power transmission mechanism and more particularly to an attachment that may be readily applied to washing machines, sewing machines, churns or the like to provide operating means for the same. With the foregoing and other objects in view the invention consists in the combination and arrangement of parts to be hereinafter fully described, pointed out in the appended claims and illustrated in the accompanying drawing which forms a part of this specification and in which—

Like reference characters denote corresponding parts in both views.

Figure 1:
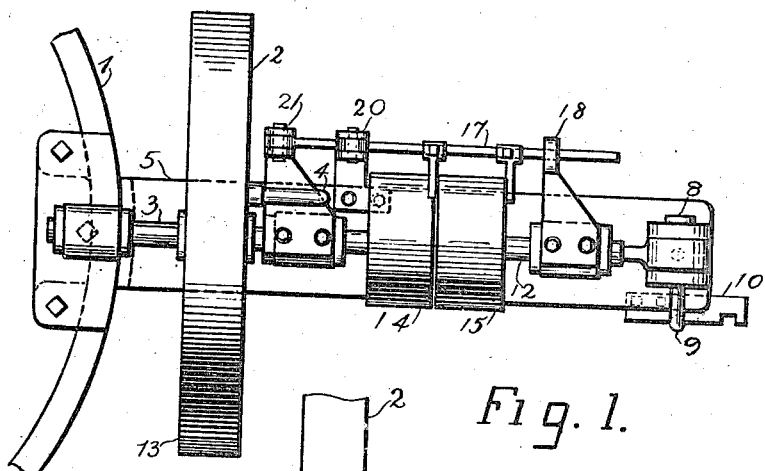
Figure 1 is a top plan view of our improved mechanism illustrating its application.

The reference numeral 1 denotes the machine to be operated, which may be a washing machine, churn or the like and which is provided with a toothed fly wheel 2 arranged upon the work shaft 3, said fly wheel being provided with an ordinary handle 4 by means of which it may be rotated when the machine is to be driven by hand power. The handle is of the type adapted to be removably secured to the wheel. When it is desired to operate the machine 1 by motor we provide an attachment comprising a bracket 5 removably secured by screws 6 to the machine. Upon the free end of the said bracket a movable bearing 7 is fulcrumed, said bearing being moved upon its fulcrum 8 through the medium of a hand lever 9 which is adapted for engagement with a rack 10, carried by said bracket 5, to releasably retain said lever in adjusted position. The said bearing 7 at its non-fulcrumed end is connected by an expansion spring 11 to the said bracket 5, said spring having a tendency to space the non-fulcrumed end of the bearing the maximum distance away from the said bracket 5.

A transmission shaft 12 is journaled in the bearing 7 and carries a pinion 13 at one end adapted for engagement with the fly wheel 2. An idler 14 and a drive pulley 15 are also arranged adjacent each other upon the said shaft 12 for engagement, singly, with the motor-driven belt 16 which belt may be engaged by a belt shifter 17 to move said belt from the idler 14 to the drive pulley 15 or vice versa. One end of the belt shifter is journaled in a standard 18 carried by the bearing 7 and the other end is connected to a bell crank 19 fulcrumed upon a standard 20 carried by said brackets 5, said bell crank also being connected to a standard 21 carried by the bearing 7.

Figure 2:
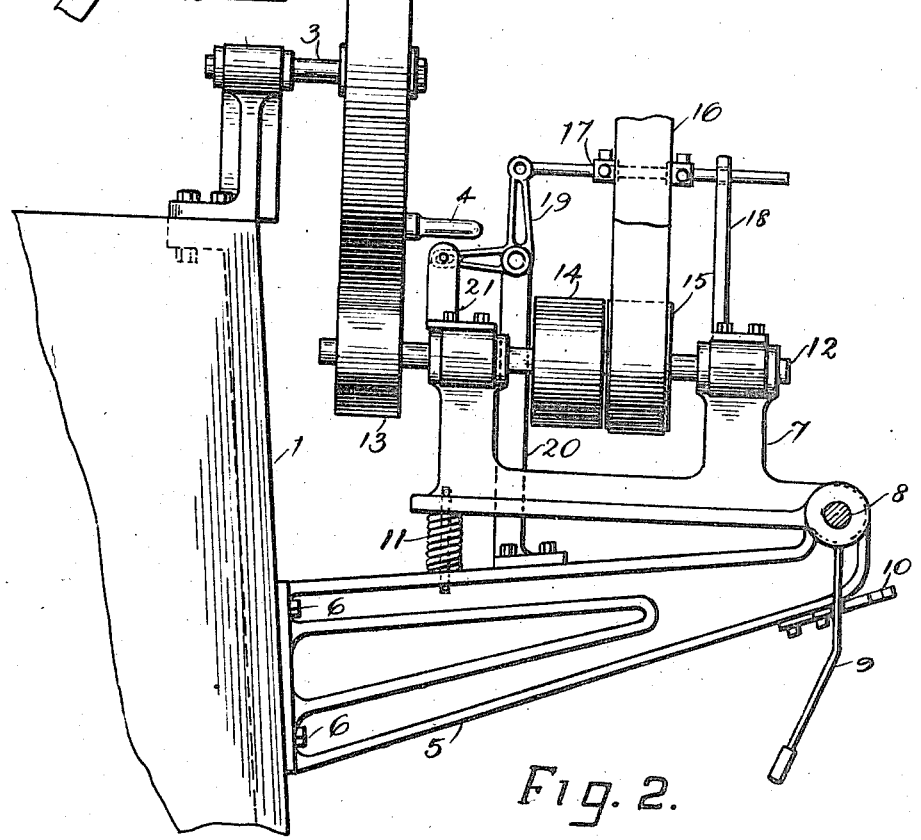
Fig. 2 is a side elevation of Fig. 1.

In Fig. 2 the pinion 13 is shown in mesh with the fly wheel 2 to drive the same. To disconnect the pinion and fly wheel the operator moves the lever 9 into the notch in rack 10 at the free end of that rack thereby moving the non-fulcrumed end of the bearing 7 toward the bracket 5 against the tension of spring 11. This movement will cause the belt shifter to move the belt from pulley 15 to idler 14 and at the same time separate the pinion and fly wheel. To throw the last named members into mesh again the lever 9 is moved back into the position shown in Fig. 2 or away from the free end of the rack 10.

What is claimed is:—

1. In power transmission mechanism, a bracket, a bearing fulcrumed at one end to said bracket, a spring connecting said bracket and the non-fulcrumed end of said bearing for yieldingly spacing the same the maximum distance from said bracket, manually operable means for adjusting and locking said bearing with relation to said bracket, a power transmission shaft journaled in said bearing, a pinion carried by said power transmission shaft, an idler carried by said shaft, a drive pulley carried by said shaft adjacent said idler, a belt adapted for alternate engagement with said idler and drive pulley, and means carried by said bearing for engagement with said belt to automatically shift the same from said idler to said drive pulley or vice versa as said bearing is adjusted with relation to said bracket.

2. In power transmission mechanism, a bracket, a bearing fulcrumed at one end to said bracket, a spring connecting said bracket and the non-fulcrumed end of said bearing for yieldingly spacing the same the maximum distance from said bracket, a rack carried at the free end of said bracket, a lever connected to said bearing for actuating the same and adapted for engagement with the said rack, a power transmission shaft journaled in said bearing, a pinion carried by said power transmission shaft, an idler carried by said shaft, a drive pulley carried by said shaft adjacent said idler, a belt adapted for alternate engagement with said idler and drive pulley, and means carried by said bearing for engagement with said belt to automatically shift the same from said idler to said drive pulley or vice versa as said bearing is adjusted with relation to said bracket.

3. In power transmission mechanism, a bracket, a bearing fulcrumed at one end to said bracket, a spring connecting said bracket and the non-fulcrumed end of said bearing for yieldingly spacing the same the maximum distance from said bracket, a rack carried at the free end of said bracket, a lever connected to said bearing for actuating the same and adapted for engagement with the said rack, a power transmission shaft journaled in said bearing, a pinion carried by said power transmission shaft, an idler carried by said shaft, a drive pulley carried by said shaft adjacent said idler, a belt adapted for alternate engagement with said idler and drive pulley, a standard carried by said bracket, standards carried by said bearing at opposite sides of the first named standard, a bell crank fulcrumed to the first named standard and connected to one of the other standards, and a belt shifter connecting said bell crank and the remaining standard.

In testimony that we claim the foregoing as our own we have hereto affixed our signatures in the presence of two subscribing witnesses.

KENNETH F. HARLOW.
CHARLES E. MATHEWS.

Witnesses:
W. H. ARNOLD,
T. D. WOOLSEY.

Copies of this patent may be obtained for five cents each, by addressing the "Commissioner of Patents, Washington, D. C."